Feb. 24, 1931.  F. S. FLOETER  1,793,789
TOOL FEED DEVICE FOR CRANK PIN TURNING LATHES
Filed Oct. 17, 1929  2 Sheets-Sheet 1

INVENTOR
Frederick S. Floeter
BY
ATTORNEY

Feb. 24, 1931. F. S. FLOETER 1,793,789
TOOL FEED DEVICE FOR CRANK PIN TURNING LATHES
Filed Oct. 17, 1929 2 Sheets-Sheet 2

INVENTOR
Frederick S. Floeter
BY
George B. Willcox
ATTORNEY

Patented Feb. 24, 1931

1,793,789

UNITED STATES PATENT OFFICE

FREDERICK S. FLOETER, OF SAGINAW, MICHIGAN, ASSIGNOR TO WICKES BROS., OF SAGINAW, MICHIGAN, A CORPORATION OF MICHIGAN

TOOL-FEED DEVICE FOR CRANK-PIN-TURNING LATHES

Application filed October 17, 1929. Serial No. 400,260.

This invention relates to machines for turning the bearing surfaces of one or more crank pins formed integral with a shaft and pertains more particularly to the type of lathe in which the shaft is rotated on its axis, the cutting tools following the crank pin in its revolution. Machines of the kind to which my invention is adapted to be applied comprise essentially two shafts that are parallel with the axis of the crank shaft to be machined and carry eccentrics on which are mounted one or more tool-carrying frames upon which are the tool-holders. The eccentrics impart to each frame a movement like that of the side rod connecting the drive wheels of a locomotive, which movement I shall designate for purposes of description as orbital.

My invention is adapted to be applied to a machine of the type illustrated in Patent No. 1,011,849, issued December 12, 1911, to Riddell.

The invention as claimed herein is embodied in a mechanism involving a new mode of operation for feeding the tools into and away from the work.

The improvement provides a mechanism, actuated either from the main motor drive of the machine or by an independent auxiliary motor, whereby the feed of the tools into the work during the orbital movement of the tool-carrying frames can be accomplished accurately and positively.

My invention also includes a novel arrangement of parts operatively connecting the several tool-holders with a single power source so all tools are fed into the work simultaneously and with exactly the same amount of feed, regardless of the fact that the tools themselves are describing orbits or circles of revolution. Slippage is avoided, assuring uniform finished diameters for the several crank pins of a multiple crank shaft.

With the foregoing and certain other objects in view, which will appear later in the specification, my invention comprises the devices described and claimed and the equivalents thereof.

Figure 1:
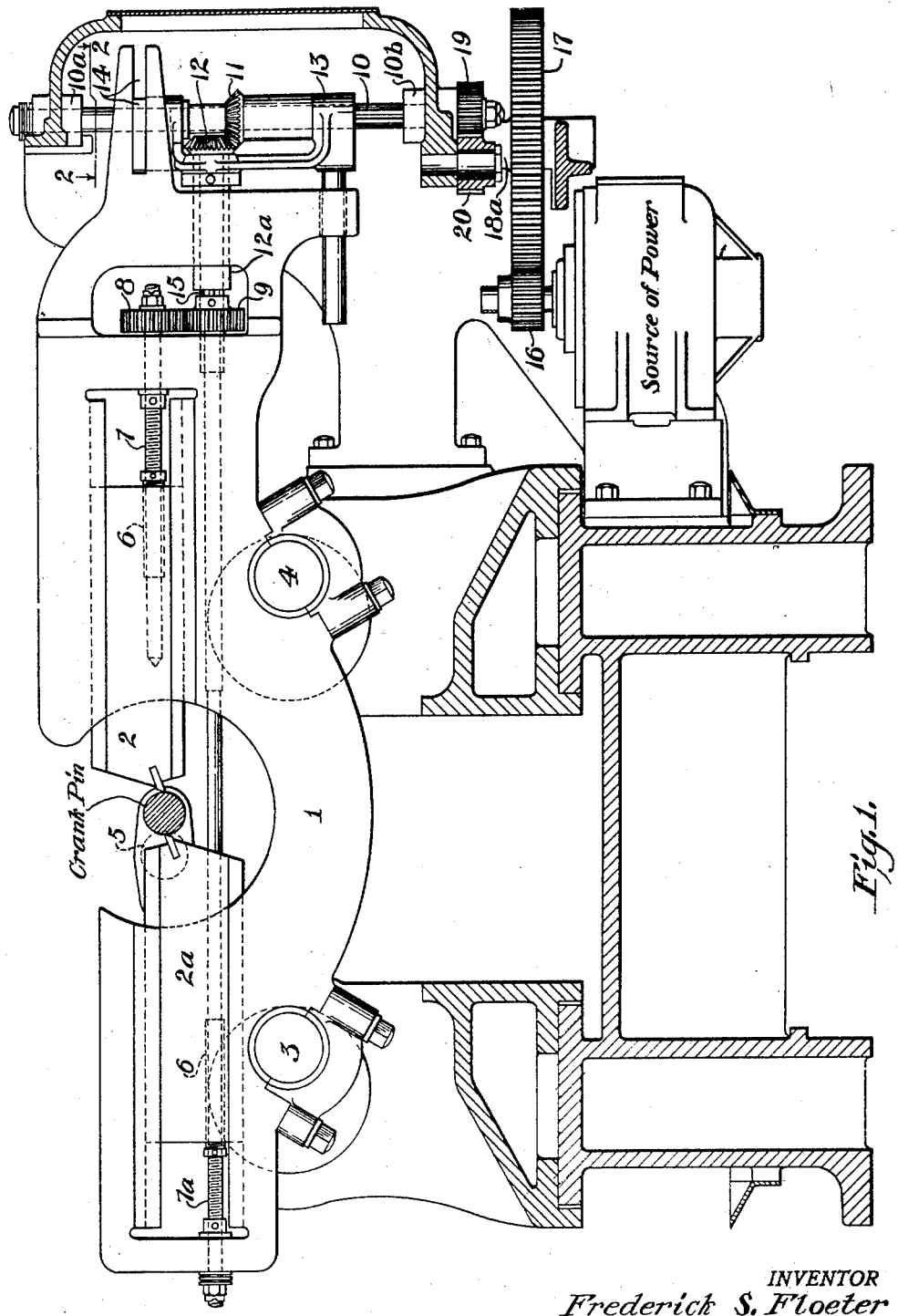

In the drawings Fig. 1 is a part sectional elevation through a crank pin turning lathe embodying my improvement.

Figure 2:
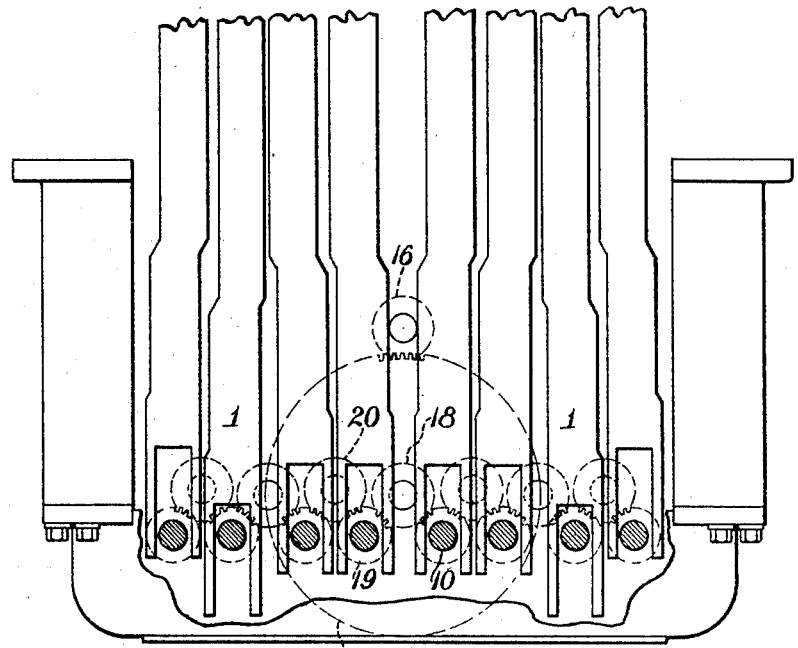

Fig. 2 is a part sectional fragmentary plan view on line 2—2 of Fig. 1, showing the transmission gears.

As is clearly shown in the drawings, the tool-carrying frame 1 with its tool-holders 2 and 2a is mounted on a pair of parallel master shafts 3, 4 and, as in the patent above referred to, is provided with eccentric means whereby the master shafts impart to the tool-carrying frame 1 a parallel-rod movement in phase with the crank pin of crank shaft 5.

In applying my improved tool feed to a machine of this kind I provide each tool-holder 2 on the orbital frame with a threaded nut 6 and a feed screw 7. When two oppositely placed tool-holders 2, 2a are to be used, as shown in the drawings, the respective feed screws 7, 7a are carried in bores and are connected by a pair of gears 8, 9 so that rotation of one gear, as 9, will produce the desired feeding of the two tools in tool-holders 2 and 2a.

Every part of the tool-carrying frame 1 describes a circle of revolution during the pin-turning operation and all of the tool-carrying frames of the machine are to be connected to and simultaneously operated from a single source of power, such as the oil motor shown in Fig. 1. Means is provided for translating the rotation of the motor spindle into simultaneous feeding movement of all of the cutting tools on all of the tool-carrying frames, regardless of the orbital movement of the frames.

A drive shaft 10, preferably a splined shaft, is rotatable in fixed bearings 10a, 10b on the machine housing and geared to the motor. On shaft 10 is fixed a gear 11, preferably feathered thereto so as to be slidable lengthwise thereon. Another intermeshing gear 12 is mounted on a bracket 13 with the gear 11 so that both gears 11 and 12 can move up and down lengthwise the drive shaft 10 while they are being rotated by that shaft.

The intermeshing gears are preferably miter gears, but they may be beveled gears, spiral gears, friction gears, or any other design that is found to answer the purpose, without departing from the spirit of my invention as set forth in certain of the claims.

The bracket 13 is connected to the orbital tool-carrying frame 1 by means of the flange and slot connection 14 shown in Fig. 1, and although the gears are traversed up and down the drive shaft with the tool-carrying frame during its movement in a vertical direction they are restrained from partaking of the movement of the frame in its horizontal direction.

To accommodate their horizontal movement the second gear 12 has its shaft 12a projecting into the tool-carrying frame 1 and operatively connected, by a sliding joint 15 or a telescopic shaft, to the feed screw gear 9. Thus rotation of the second gear 12 is translated into a positive feeding movement of the cutting tools, regardless of the movement of the tool-carrying frame in a horizontal direction during its orbital movement.

I will now describe the means by which a number of tool-carrying frames, say, eight in a machine adapted for an eight-throw crank, are simultaneously fed from a single source of power such as the oil motor shown in Fig. 1. A pinion 16 is mounted on the motor shaft and meshes with a large gear 17 carrying a drive pinion 18 on an elongated hub 18a and this drive pinion 18 meshes with one or two splined drive-shaft pinions 19. When the drive pinion 18 is connected as shown in Fig. 2 it operates the feeds on two of the tool-carrying frames. The rest of the series of feeds are operated by idler pinions 20 geared to the successive drive shafts 10, as shown.

In operation the tools are set up to work in the usual manner by means of the adjusting nuts 6 and the feed screws 7 and 7a. The work being in place on the lathe centers in the usual way, the machine is started and each tool-carrying frame 1 commences its typical parallel rod or orbital movement. The horizontal component of its travel is taken care of by the lengthening and shortening of the telescopic shaft 15. The vertical component of travel of frame 1 causes the two gears 11 and 12 and their bracket 13 to slide up-and-down along the revolving drive shaft 10. The motor rotates all of the drive shafts 10 simultaneously and consequently identical feed is imparted to the tools operating on each of the several crank pins. When the desired finished size is attained the feed is stopped by stopping or reversing the feed motor, or throwing it out of gear.

In practice I prefer to employ an oil motor that operates independently of the main lathe drive mechanism because of its positive action and ease of speed control, but obviously, the feed device may if desired be driven from any suitably revolving part of the lathe, as for example, the main lathe spindles.

Having thus described my invention, what I claim and desire to secure by Letters Patent is:

1. In combination an oscillatable tool-carrying frame, a tool holder thereon, a telescopic shaft, one member thereof carried by said frame and operatively connected to said tool holder, a drive shaft rotatable on fixed bearings in the plane of oscillation of the frame and geared to a source of power, a pair of intermeshing gears one of which is rotatable with the drive shaft and slidable lengthwise thereon, the other gear secured to the other member of said telescopic shaft and a bracket carrying said gears and operatively connected to said frame.

2. In combination an oscillatable tool-carrying frame, a tool holder thereon, a telescopic shaft, one member thereof carried by said frame and operatively connected to said tool holder, a rotatable drive shaft mounted on fixed bearings and located in the plane of oscillation of the frame and geared to a source of power, a pair of intermeshing gears one of which is mounted on the drive shaft, rotatable therewith and slidable lengthwise thereon, the other gear situated in fixed relation with said first-mentioned gear and movable therewith and secured to the other member of said telescopic shaft and a bracket carrying said gears, said bracket operatively connected to said frame by a sliding joint which is arranged to permit unrestrained movement of the frame toward and away from the drive shaft and to constrain the bracket and gears to travel with the frame in directions lengthwise the shaft.

3. In combination with the oscillatory tool-carrying frame of a crank pin turning lathe of the class described, a tool-feeding device comprising a pair of co-operating rotating elements arranged with their axes intersecting in the plane of oscillation of said frame, means associated with the frame for traversing said elements with the frame during its reciprocatory movement in one direction while restraining said elements from partaking of the reciprocatory movement of the frame in another direction, means for rotating said elements during the oscillatory movement of the frame and a shaft secured to one of said elements and rotatable therewith, and means operatively connecting said shaft and said tool holder and adapted to impart feeding movement to the latter during its oscillatory movement, said means including a feed screw for said holder, a gear for turning said screw, a gear on said shaft, and a telescopic joint in said shaft to permit elongation and retraction thereof during said oscillatory movement.

4. In combination with the oscillatory tool-carrying frame of a crank pin turning lathe of the class described, a tool-feeding device comprising a pair of co-operating rotating elements, means associated with the frame for bodily moving said elements with the frame during its oscillatory movement in one direction while restraining said elements from partaking of the oscillatory movement of the frame in another direction, means for rotating said elements during the movement of the frame and means operatively connecting one of said elements with said tool holder to impart feeding movement to the latter during its oscillatory movement.

5. In combination with the oscillatory tool-carrying frame of a crank pin turning lathe of the class described, a tool-feeding device comprising a pair of co-operating rotating elements arranged with their axes in lines intersecting in the plane of oscillation of said frame, means for traversing said elements with the frame during its reciprocatory movement in one direction while restraining said elements from partaking of the reciprocatory movement of the frame in another direction, means for rotating said elements during the oscillatory movement of the frame and a shaft secured to one of said elements and rotatable therewith, and means operatively connecting said shaft and said tool holder and adapted to impart feeding movement to the latter during its oscillatory movement.

In testimony whereof, I affix my signature.

FREDERICK S. FLOETER.